(12) United States Patent
Watanabe

(10) Patent No.: US 11,758,070 B2
(45) Date of Patent: Sep. 12, 2023

(54) OPERATING AN IMAGE FORMING APPARATUS WITH A VISIBLE CODE

(71) Applicant: KYOCERA Document Solutions Inc., Osaka (JP)

(72) Inventor: Toshihiko Watanabe, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 64 days.

(21) Appl. No.: 17/675,120

(22) Filed: Feb. 18, 2022

(65) Prior Publication Data

US 2022/0263975 A1     Aug. 18, 2022

(30) Foreign Application Priority Data

Feb. 18, 2021    (JP) ................................ 2021-023905

(51) Int. Cl.
     *H04N 1/44*      (2006.01)
     *G06V 40/10*     (2022.01)
     *H04N 1/00*      (2006.01)
     *G06K 7/14*      (2006.01)

(52) U.S. Cl.
CPC ......... *H04N 1/4413* (2013.01); *G06K 7/1417* (2013.01); *G06V 40/10* (2022.01); *H04N 1/00037* (2013.01); *H04N 1/00204* (2013.01); *H04N 1/00464* (2013.01); *H04N 1/00896* (2013.01); *H04N 1/4433* (2013.01); *H04N 2201/0096* (2013.01)

(58) Field of Classification Search
None
See application file for complete search history.

(56) References Cited

U.S. PATENT DOCUMENTS

| 8,610,935 | B1* | 12/2013 | McKinley | .......... | H04N 1/00363 |
| | | | | | 358/1.15 |
| 2003/0184797 | A1* | 10/2003 | Hiramoto | .............. | G06F 3/1292 |
| | | | | | 358/1.18 |
| 2013/0215446 | A1* | 8/2013 | Imai | .................... | H04N 1/00875 |
| | | | | | 358/1.13 |
| 2019/0306336 | A1* | 10/2019 | Takenaka | ................ | H04W 4/80 |

FOREIGN PATENT DOCUMENTS

JP      2016-071620      5/2016

\* cited by examiner

*Primary Examiner* — Miya J Cato
*Assistant Examiner* — Pawan Dhingra
(74) *Attorney, Agent, or Firm* — LEX IP MEISTER, PLLC

(57) ABSTRACT

An image forming apparatus 1 (a) displays a visible code in which network identification information of the image forming apparatus 1 is encoded and a function code corresponding to a function of the image forming apparatus 1, (b) transmits function designation screen data to the portable terminal device 2 connected by using the network identification information, (c) receives a function code input to a function designation screen based on the function designation screen data from the portable terminal device 2 via a network, (d) determines whether the received function code matches the displayed function code or not, (e1) transmits operation screen data corresponding to the function code to the portable terminal device 2 via the network when both match, and (e2) does not transmit operation screen data to the portable terminal device 2 when both do not match.

5 Claims, 7 Drawing Sheets

OPERATING AN IMAGE FORMING APPARATUS WITH A VISIBLE CODE

INCORPORATION BY REFERENCE

This application is based upon, and claims the benefit of priority from, corresponding Japanese Patent Application No. 2021-023905 filed in the Japan Patent Office on Feb. 18, 2021, the entire contents of which are incorporated herein by reference.

BACKGROUND

The present disclosure relates to an apparatus control system and an image forming apparatus.

In a system for controlling an image forming apparatus, the image forming apparatus displays a visible code (two dimensional code) in which device-specific information is encoded, and a mobile terminal captures the visible code, decodes the visible code to obtain an IP address, a user ID, and a password, connects to the image forming apparatus with the IP address, the user ID, and the password, and displays a remote panel window which starts a remote panel application according to a user operation and provides a user interface for the image forming apparatus.

SUMMARY

An apparatus control system according to the present disclosure includes an image forming apparatus connected to a network, and a portable terminal device connectable to the network. The image forming apparatus (a) displays a visible code in which network identification information of the image forming apparatus in the network is encoded and a function code corresponding to one or more functions of the image forming apparatus, (b) transmits function designation screen data to the portable terminal apparatus connected by using the network identification information, (c) receives a function code input to a function designation screen based on the function designation screen data from the portable terminal device via the network, (d) performs authentication processing to determine whether the received function code matches the displayed function code, (e1) transmits operation screen data corresponding to the function code to the portable terminal device via the network when the received function code matches the displayed function code, and (e2) does not transmit the operation screen data to the portable terminal device when the received function code does not match the displayed function code. The portable terminal device (a) captures the visible code to generate a captured image, (b) decodes the visible code in the captured image to acquire the network identification information, and connects to the image forming apparatus via the network based on the network identification information, (c) receives the function designation screen data from the image forming apparatus via the network, (d) displays a function designation screen based on the function designation screen data with a general-purpose browser, (e) specifies a function code input to the function designation screen by a user and transmits the function code to the image forming apparatus via the network, (f) receives the operation screen data corresponding to the function code from the image forming apparatus via the network, and (g) displays an operation screen based on the operation screen data.

An image forming apparatus according to the present disclosure includes a communication device connected to a network, a display device, a code managing unit that displays on the display device a visible code in which network identification information of the image forming apparatus in the network is encoded and a function code corresponding to one or more functions of the image forming apparatus, a server processing unit that transmits function designation screen data to a portable terminal device connected by using the network identification information and receives from the portable terminal device via the network a function code input to a function designation screen based on the function designation screen data, and an authentication processing unit that performs authentication processing to determine whether the received function code matches the displayed function code. Next, when the received function code matches the displayed function code, the server processing unit transmits operation screen data corresponding to the function code to the portable terminal device via the network, and when the received function code does not match the displayed function code, the server processing unit does not transmit the operation screen data to the portable terminal device.

DETAILED DESCRIPTION

Hereinafter, an embodiment of the present disclosure will be described with reference to the drawings.

Figure 1:
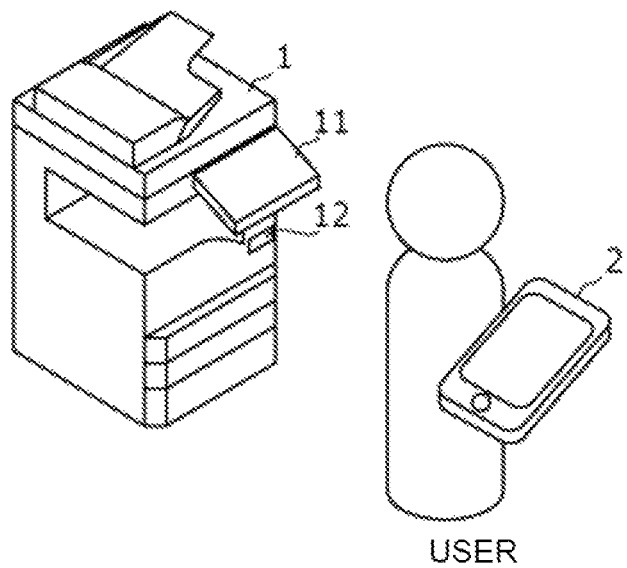
FIG. 1 is a diagram illustrating a configuration of an apparatus control system according to an embodiment of the present disclosure.

FIG. 1 is a diagram illustrating a configuration of an apparatus control system according to an embodiment of the present disclosure. The system illustrated in FIG. 1 includes an image forming apparatus 1 and a portable terminal device 2. The image forming apparatus 1 is an electronic apparatus, such as a printer or a multifunction peripheral, and includes an operation panel 11 and a human detection sensor 12. The portable terminal device 2 is an electronic apparatus, such as a smartphone or a tablet PC, which is carried by a user using the image forming apparatus 1.

The image forming apparatus 1 is connected to a network such as the Internet, and the portable terminal device 2 is connectable to the network via a wireless Local Area Network (LAN), a cellular phone network or the like.

In this system of the present disclosure, the image forming apparatus 1 is arranged in a place available to an unspecified large number of users, and a plurality of users carry a plurality of the portable terminal devices 2, respectively.

Figure 2:
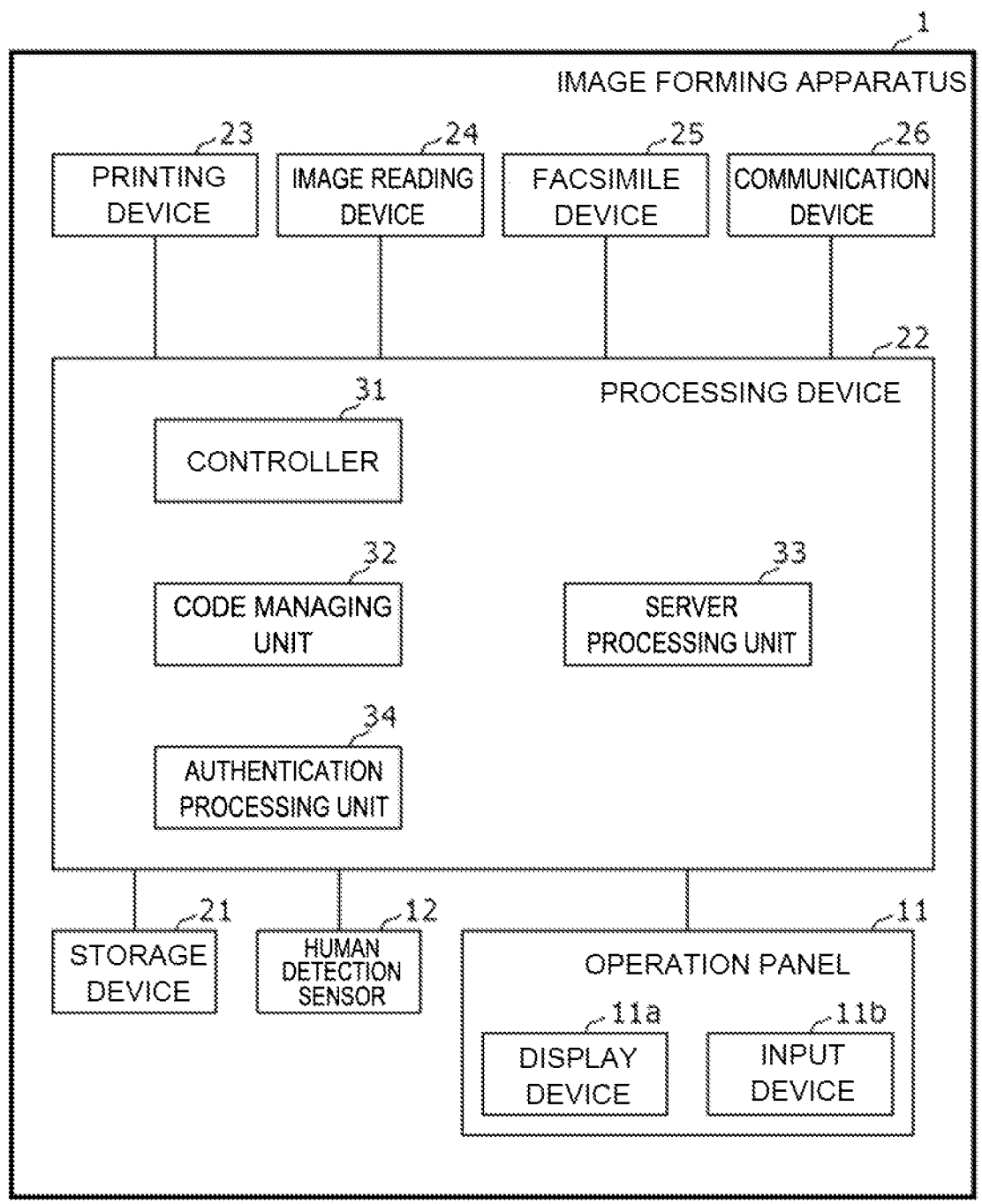
FIG. 2 is a block diagram illustrating a configuration of image forming apparatus 1 in FIG. 1.

FIG. 2 is a block diagram illustrating a configuration of image forming apparatus 1 in FIG. 1.

As illustrated in FIG. 2, the image forming apparatus 1 includes a storage device 21, an arithmetic processing device 22, a printing device 23, an image reading device 24, a facsimile device 25, a communication device 26, and the like, in addition to the operation panel 11 and the human detection sensor 12 described above.

The operation panel 11 is arranged at a front side of a housing of the image forming apparatus 1, and includes a display device 11a such as a liquid crystal display, and an input device 11b such as hard keys and a touch panel. The display device 11a displays various screens to a user. Soft keys are implemented by the key images and the touch panel displayed on the 11a of the display device. The input device 11b receives a user operation on a hard key or a soft key input by a user.

The human detection sensor 12 is a sensor (such as an infrared sensor) that detects a person present within a predetermined range in front of the operation panel 11.

The storage device 21 is a nonvolatile rewritable storage device such as a flash memory.

The arithmetic processing device 22 is a computer including a Central Processing Unit (CPU), a Read Only Memory (ROM) and a Random Access Memory (RAM), and operates as various processing units by loading and executing programs from the storage device 21 and the ROM to the RAM. The arithmetic processing device 22 acts as a controller 31, a code managing unit 32, a server processing unit 33, and an authentication processing unit 34.

The printing device 23 prints, according to the print job request based on a user operation, an image specified by the print job request on a print sheet. Furthermore, the image reading device 24 optically reads a document image from a document in accordance with a copy job request based on a user operation, and generates image data of the document image. In accordance with a facsimile transmission job request based on a user operation, the facsimile device 35 generates and transmits a facsimile signal of an image specified by the facsimile transmission job request, receives a facsimile signal from outside, and generates image data from the facsimile signal. The communication device 26 is a wireless or wired network interface or the like, and performs data communication with an external device (such as the portable terminal device 2).

The controller 31 controls internal devices such as the printing device 23, the image reading device 24, the facsimile device 25, and the communication device 26 to execute a job specified by the job request. For example, upon receiving a print job request, the controller 31 causes the printing device 23 to print an image specified by the print job request, upon receiving a copy job request, the image reading device 24 to scan an image of a document under scan settings specified by the copy job request and cause the printing device 23 to print the image of the document under print settings specified by the copy job request.

In the present embodiment of the present disclosure, the controller 31 sets the operation mode as a normal mode at the start of the image forming apparatus 1, changes the operation mode from the normal mode to the sleep mode when a user non-detection period is over a predetermined time length while the operation mode is the normal mode, and changes the operation mode from the sleep mode to the normal mode when a user is detected by the operation panel 11 or the human detection sensor 12 or a job request is received via the network while the operation mode is the sleep mode. In the sleep mode, when the display device 42 and the like are turned off or a power source of a predetermined internal device is interrupted, power consumption becomes lower than that in the normal mode.

In this embodiment, the above-described job request is input based on a user operation on the operation panel 11 in the first panel operation mode, and the job request is received from the portable terminal device 2 in the second panel operation mode. In the first panel operation mode, a user operation on the menu screen displayed on the operation panel 11 is accepted as a job request corresponding to a function (print, copy, or the like) desired by the user. In the second panel operation mode, a job request based on an operation on the operation screen displayed on the portable terminal device 2 is received from the portable terminal device 2 without display of the menu screen or the like in the second panel operation mode.

The first panel operation mode and the second panel operation mode are selected by the controller 31 according to system settings, user operations, or the like. The processing unit of the image forming apparatus 1 operating in the second panel operation mode will be described below.

The code managing unit 32 generates a function code corresponding to one or a plurality of functions (printing, copying, and the like) of the image forming apparatus, and displays network identification information unique to the image forming apparatus 1 in the network (here, a visible code in which a Uniform Resource Locator (URL)) is encoded (e.g. a QR Code®) and the generated function code on a display device 11a. In a case where a plurality of function codes are generated and displayed, values of the function codes are generated to be different from each other.

Figure 3:
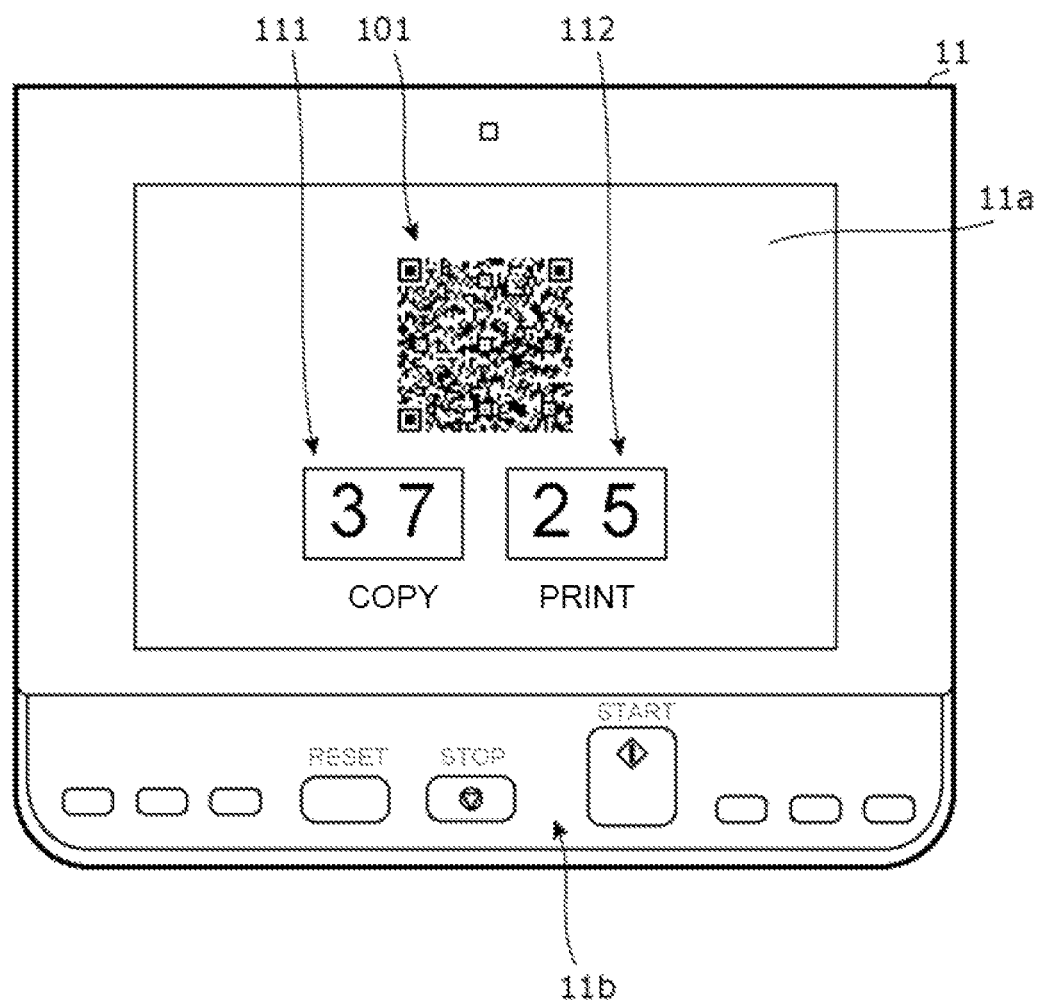
FIG. 3 is a diagram illustrating an example of a visible code and two function codes displayed on the image forming apparatus 1 in FIG. 1.

FIG. 3 is a diagram illustrating an example of a visible code and two function codes displayed on the image forming apparatus 1 in FIG. 1. For example, as illustrated in FIG. 3, a visible code 101 and two function codes 111 and 112 are displayed in one screen in the display device 11a of the operation panel 11. The function code 111 is a function code of a copy function, and the function code 112 is a function code of a print function. The value of the function code 111 is set to 37, and the value of the function code 112 is set to 25. That is, here, the function code 111 and the function code 112 are specified by a two-digit number. Note that the number of digits (number of characters) and a character type of the function code to be displayed are not particularly limited.

The server processing unit 33 has a web server function and receives a request transmitted in Hypertext Transfer Protocol (HTTP) or the like via a network.

In particular, the server processing unit 33 sends the function designation screen data (the webpage data described in Hypertext Markup Language (HTML)) via the network to the portable terminal device 2 connected to the server processing unit 33 by using the network identification information encoded in the visible code described above.

Furthermore, the server processing unit 33 receives the authentication request received from the portable terminal device 2 which is the destination of the function designation screen data via the network, and when the authentication with respect to the authentication request is successful, transmits the operation screen data (the web page data described in HTML) corresponding to the function code specified by the authentication request.

The authentication processing unit 34 performs authentication processing to determine whether the function code received from the server processing unit 33 matches the function code displayed on the display device 11a.

When the received function code matches the displayed function code, as described above, the operation screen data corresponding to the function code is transmitted to the portable terminal device 2. On the other hand, when the received function code does not match the displayed function code, the operation screen data is not transmitted to the portable terminal device 2, and an authentication error is transmitted as a response to the portable terminal device 2.

In the present embodiment of the present disclosure, when the operation mode of the image forming apparatus 1 is the sleep mode and a person is detected by the human detection sensor 12, and when the controller 31 changes the operation mode to the normal mode, the code managing unit 32 updates the function code to be displayed and starts displaying the visible code and the function code. On the other hand, when a person is no longer detected by the human detection sensor 12, the controller 31 changes the operation mode to the sleep mode and the code managing unit 32 stops displaying the visible code and the function code.

Furthermore, when the function code has been received a predetermined number of times (e.g. three times) and the received function code does not match the displayed function code, the authentication processing unit 34 prohibits any subsequent authentication processing (i.e. prohibits transmission of the operation screen data) and releases the prohibition of the authentication processing when the operation mode of the image forming apparatus 1 is changed from the sleep mode to the normal mode after the authentication processing is prohibited.

In the present embodiments of the present disclosure, the value of the function code may be randomly determined, and may be newly generated by a random number or the like at the time of update.

Furthermore, in a case where the received function code matches the displayed function code in the above-described authentication processing, the code managing unit 32 may update the function code to be displayed.

Figure 4:
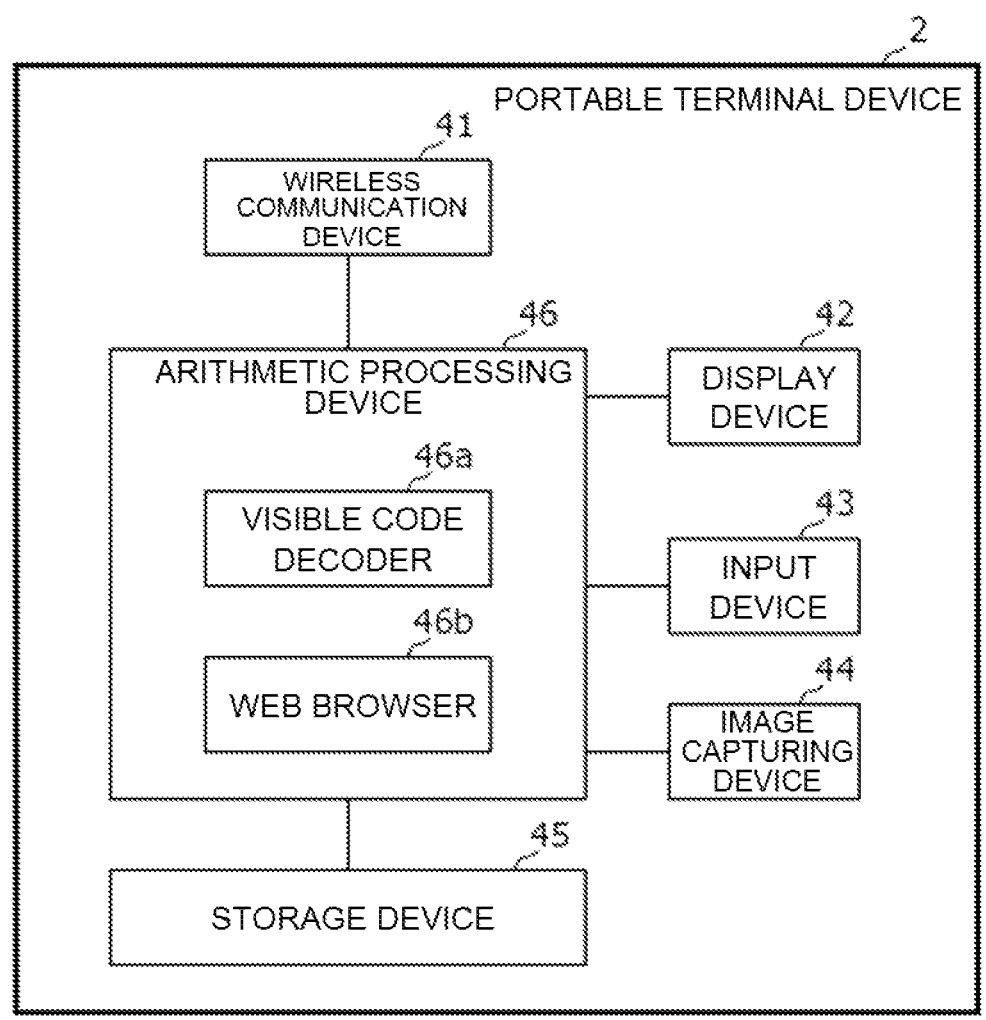
FIG. 4 is a block diagram illustrating a configuration of the portable terminal device 2 in FIG. 1.

FIG. 4 is a block diagram illustrating a configuration of the portable terminal device 2 in FIG. 1.

The portable terminal device 2 includes a wireless communication device 41, a display device 42, an input device 43, an image capturing device 44, a storage device 45, an arithmetic processing device 46, and the like.

The wireless communication device 41 is a communication circuit compliant with a predetermined wireless communication standard. The wireless communication device 41 is a wireless LAN interface and/or an interface of a mobile phone communication network (an RF interface, a baseband section, and the like).

The display device 42 is a device such as a liquid crystal display disposed in the housing of the portable terminal device 2 and displays various screens to a user. The input device 43 is a device that detects a user operation, and includes a touch panel, hard keys, and the like disposed on the display device 42. The image capturing device 44 includes an optical system and an image sensor, detects an image of a visual field by the optical system by means of the image sensor, and outputs it as image data.

The storage device 45 is a nonvolatile storage device such as a flash memory and stores a program and data. The storage device 45 stores a program of an operating system, a program of a general-purpose web browser and a general-purpose visible code decoder, and the like.

The arithmetic processing device 46 is a computer including a CPU, a ROM, a RAM and the like, and operates as various processing units by loading and executing programs from the storage device 45 and the ROM to the RAM. In this embodiment, the arithmetic processing device 46 acts as a general-purpose visible code decoder 46a and a general-purpose web browser 46b.

In the present embodiments of the present disclosure, the visible code decoder 46a is a visible code decoder for a specific two dimensional code such as a QR Code®. Furthermore, the visible code decoder 46a and the web browser 46b may be attached to the operating system and do not need to be separately installed.

Figure 5:
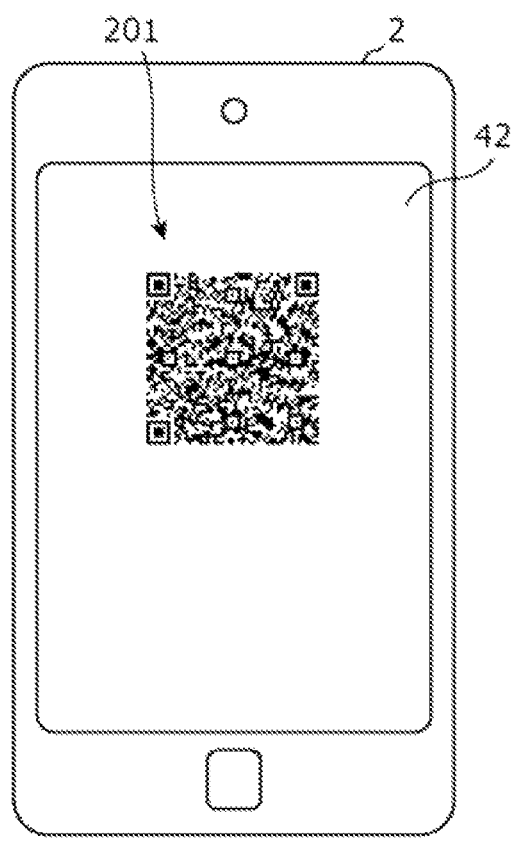
FIG. 5 is a diagram illustrating a display example of a captured image 201 including a visible code captured by the portable terminal device 2 illustrated in FIG. 4.

FIG. 5 is a diagram illustrating a display example of a captured image 201 including a visible code and captured by the portable terminal device 2 illustrated in FIG. 4. The visible code decoder 46a controls the image capturing device 44 in accordance with a user operation on the input device 43 to capture the visible code, generates a captured image 201, decodes the visible code in the captured image 201 to acquire the above-described network identification information (here, URL), and outputs the network identification information to the web browser 46b.

The web browser 46b connects to the image forming apparatus 1 via the network based on the network identification information (here, according to HTTP) using the wireless communication device 41, receives the function designation screen data from the image forming apparatus 1 via the network, and displays the function designation screen based on the function designation screen data on the display device 42.

Figure 6:
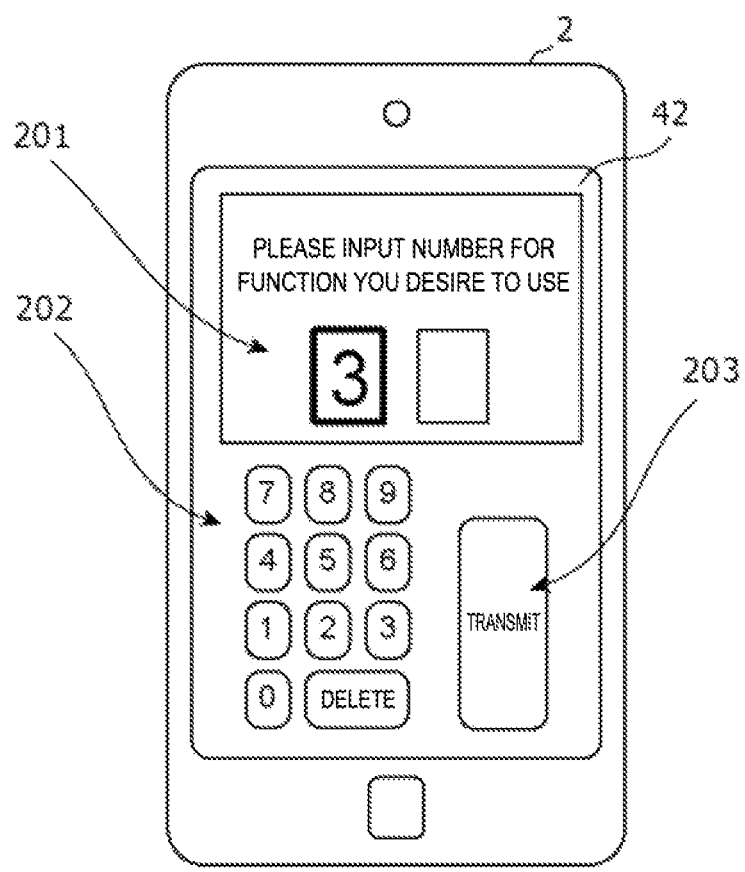
FIG. 6 is a diagram illustrating an example of a function designation screen displayed by the portable terminal device 2 illustrated in FIG. 4.

FIG. 6 is a diagram illustrating an example of a function designation screen displayed by the portable terminal device 2 illustrated in FIG. 4. For example, as illustrated in FIG. 6, the function designation screen includes an input field 201 for a function code, a soft keypad 202 used for inputting a function code, and a transmitting key 203 for transmitting a function code.

Furthermore, the web browser 46b identifies a function code input on the function designation screen by a user operation on the input device 43 (i.e., the function code of the function selected by the user) and transmits the input function code to the image forming apparatus 1 via the network by using the wireless communication device 41.

Thereafter, when the operation screen data corresponding to the function code is transmitted from the image forming apparatus 1 via the network (i.e. when the input function code is correct), the web browser 46b receives the operation screen data and displays an operation screen based on the operation screen data (i.e. an operation screen for the function selected by the user).

Figure 7:
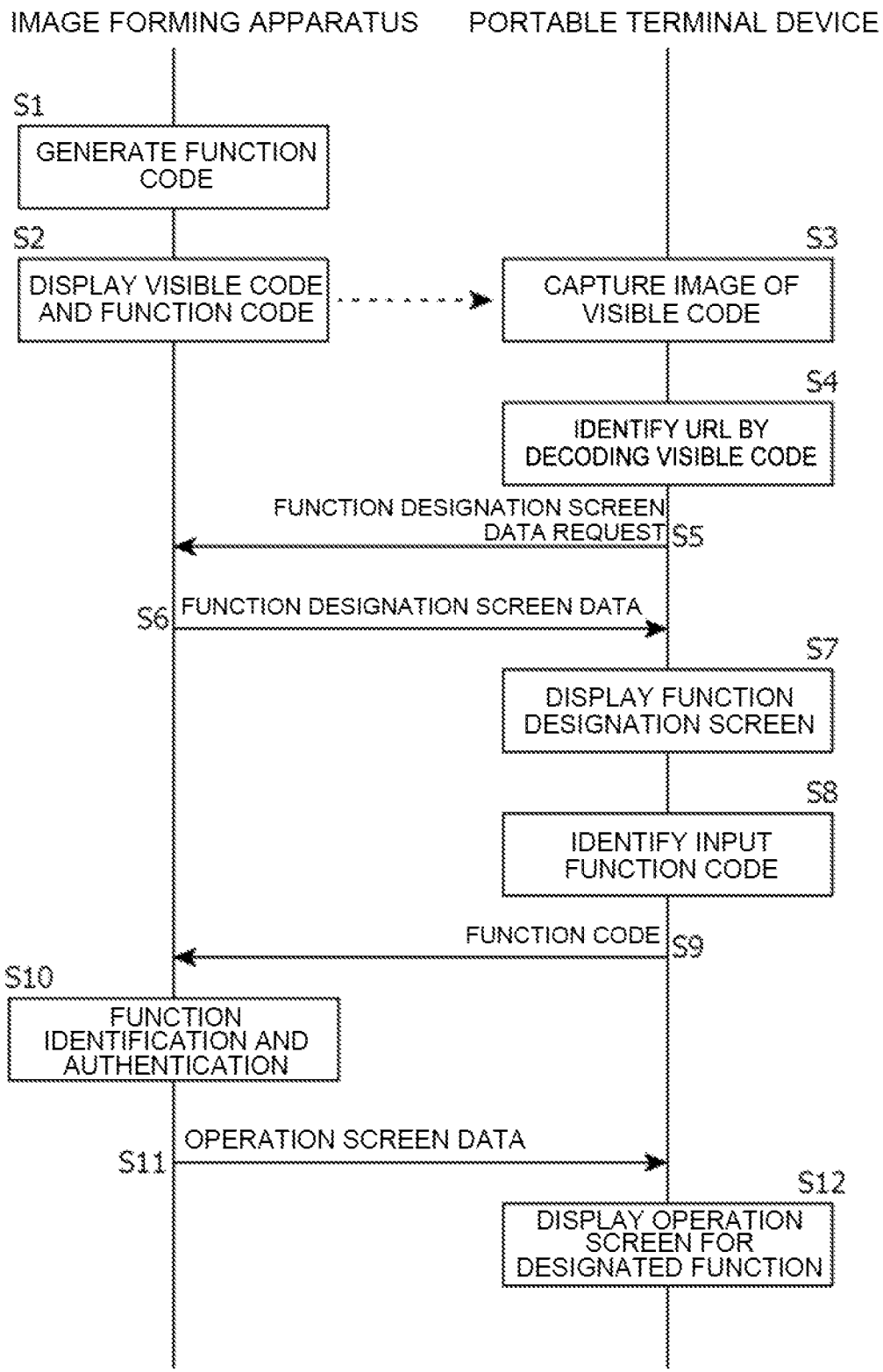
FIG. 7 is a sequence diagram illustrating operations of the apparatus control system illustrated in FIG. 1.

Next, operations of the apparatus control system will be described. FIG. 7 is a sequence diagram illustrating operations of the apparatus control system illustrated in FIG. 1.

Upon detection of a display timing (such as a change of the operation mode to the normal mode or a time of activation of the image forming apparatus 1), the code managing unit 32 generates a new function code (step S1) and displays the visible code and the generated function code on the display device 42 (step S2).

The user operates the portable terminal device 2 to cause the portable terminal device 2 to capture a visible code. At that time, the visible code decoder 46a of the portable terminal device 2 generates a captured image of the visible code (step S3), and decodes the visible code included in the captured image to acquire the network identification information (step S4). When the network identification information is acquired, the web browser 46b transmits a function designation screen data request to the image forming apparatus 1 indicated by the network identification information (step S5). That is, a request to transmit the web page indicated by the URL as the network identification information is transmitted by HTTP.

In the image forming apparatus 1, upon receiving the request using the communication device 26, the server processing unit 33 reads a datafile of a web page specified by the request (i.e. function designation screen data) from the storage device 21, and transmits the data as a response to the request using the communication device 26 (step S6).

In the portable terminal device 2, the web browser 46b receives the function designation screen data as a response to the function designation screen data request and displays the function designation screen on the display device 42 on the basis of the received function designation screen data (step S7).

The user operates the portable terminal device 2 to input a function code of a desired function from among one or more function codes displayed on the image forming apparatus 1, in a function designation screen displayed on the portable terminal device 2. At that time, in the portable terminal device 2, the web browser 46b identifies the function code input by the input device 43 (step S8) and transmits the function code to the image forming apparatus 1 (step S9).

In the image forming apparatus 1, the server processing unit 33 receives the function code using the communication device 26, and when the function code is received, the authentication processing unit 34 acquires the displayed function code from the code managing unit 32, acquires the received function code from the server processing unit 33, and determines whether the received (user-input) function code matches any of the displayed function codes (step S10).

When the identification and authentication of the function desired by the user by the authentication processing unit 34 are successful (i.e. the function code input by the user matches any of the displayed function codes), the server processing unit 33 reads the operation screen data of the function corresponding to the function code input by the user from the storage device 21 and transmits it to the portable terminal device 2 by using the communication device 26 (step S11).

In the portable terminal device 2, the web browser 46b receives the operation screen data and displays an operation screen for a function desired by the user on the display device 42 on the basis of the received operation screen data (step S12).

Thereafter, the user operates the portable terminal device 2 to cause the image forming apparatus 1 to execute a job corresponding to the function, using the operation screen. At that time, in the portable terminal device 2, the web browser 46b transmits a command corresponding to the user operation detected by the input device 43 to the image forming apparatus 1, and in the image forming apparatus 1, upon receipt of the command, the server processing unit 33 outputs the command to the controller 31 to cause the controller 31 to execute processing corresponding to the command.

On the other hand, when in step S10 the specification and authentication of the function desired by the user fail (that is, the function code input by the user does not match any of the displayed function codes), the server processing unit 33 transmits a response indicating an authentication error to the portable terminal device 2 by using the communication device 26. In the portable terminal device 2, the web browser 46b receives the response and displays, on the display device 42, a message indicating that an authentication error has occurred. In this case, the operation screen is not displayed.

As described above, according to the embodiments of the present disclosure, the image forming apparatus 1 (a) displays a visible code 101 in which network identification information of the image forming apparatus 1 is encoded and function codes 111 and 112 corresponding to one or more functions of the image forming apparatus 1, (b) transmits function designation screen data to the portable terminal device 2 connected by using the network identification information, (c) receives a function code input to a function designation screen based on the function designation screen data from the portable terminal device 2 via the network, (d) performs authentication processing for determining whether the received function code matches the displayed function code, and (e1) transmits operation screen data corresponding to the function code to the portable terminal device 2 via the network when the received function code matches the displayed function code or, (e2) does not transmit operation screen data to the portable terminal device 2 when the received function code does not match the displayed function code. The portable terminal device 2 (a) captures the visible code to generate a captured image 201, (b) decodes the visible code in the captured image 201 to acquire network identification information and connects to the image forming apparatus 1 via the network based on the network identification information, (c) receives function designation screen data from the image forming apparatus 1 via the network, (d) displays a function designation screen based on the function designation screen data in a general-purpose browser (web browser 46b), (e) specifies a function code input to the function designation screen by a user and transmits the function code to the image forming apparatus 1 via the network, (f) receives operation screen data corresponding to the function code from the image forming apparatus 1 via the network and (g) displays an operation screen based on the operation screen data.

Thus, since the user can operate the image forming apparatus 1 with the general-purpose browser, and specification and authentication of functions that the user wants to use are collectively performed based on one function code, the image forming apparatus 1 can be used with the portable terminal device 2 with satisfactory usability.

Furthermore, since turning on/off of display of the visible code and the function code is controlled by using the human detection sensor 12, the user can start operation of the image forming apparatus 1 with his/her portable terminal device 2 without contacting the operation panel 11. Consequently, contact infection that causes viral infection or the like via the operation panel 11 of the image forming apparatus 1 can be prevented or reduced.

Various changes and modifications to the above-described embodiment will be apparent to those skilled in the art. Such changes and modifications may be made without departing from the spirit and scope of the subject matter and without diminishing its intended advantages. That is, such changes and modifications are intended to be included in the scope of the claims.

What is claimed is:

1. An apparatus control system comprising:
an image forming apparatuses connected to a network; and
a portable terminal device connectable to the network,
wherein the image forming apparatus
(a) displays a visible code in which network identification information of the image forming apparatus in the network is encoded and a function code corresponding to one or more functions of the image forming apparatus;

(b) transmits function designation screen data to the portable terminal device connected by using the network identification information;

(c) receives a function code input to a function designation screen based on the function designation screen data from the portable terminal device via the network;

(d) performs authentication processing to determine whether the received function code matches the displayed function code;

(e1) transmits operation screen data corresponding to the function code to the portable terminal device via the network when the received function code matches the displayed function code; and (e2) does not transmit the operation screen data to the portable terminal device when the received function code does not match the displayed function code, and wherein the portable terminal device (a) captures the visible code to generate a captured image, (b) decodes the visible code in the captured image to acquire the network identification information, and connects to the image forming apparatus via the network based on the network identification information, (c) receives the function designation screen data from the image forming apparatus via the network, (d) displays a function designation screen based on the function designation screen data with a general-purpose browser, (e) specifies a function code input to the function designation screen by a user and transmits the function code to the image forming apparatus via the network, (f) receives the operation screen data corresponding to the function code from the image forming apparatus via the network, and (g) displays an operation screen based on the operation screen data.

2. The apparatus control system according to claim 1, wherein in a case where the received function code matches the displayed function code in the authentication processing, the image forming apparatus updates the function code to be displayed.

3. The apparatus control system according to claim 1, wherein the image forming apparatus includes a human detection sensor, and (a) when a person is detected by the human detection sensor while an operation mode of the image forming apparatus is a sleep mode, the image forming apparatus changes the operation mode to a normal mode, updates the function code to be displayed, and starts displaying the visible code and the function code, and (b) when the person is no longer detected by the human detection sensor, the image forming apparatus changes the operation mode to the sleep mode, and stops displaying the visible code and the function code.

4. The apparatus control system according to claim 3, wherein the image forming apparatus (a) prohibits the authentication processing when the function code has been received a predetermined number of times and the received function code does not match the displayed function code, and (b) releases the prohibition of the authentication processing when the operation mode of the image forming apparatus is changed from the sleep mode to the normal mode after the authentication processing is prohibited.

5. An image forming apparatus comprising:

a communication device connected to a network;

a display device;

a code managing unit that displays, on the display device, a visible code in which network identification information of the image forming apparatus in the network is encoded and a function code corresponding to one or more functions of the image forming apparatus;

a server processing unit that transmits function designation screen data to the portable terminal device connected by using the network identification information and receives a function code input for a function designation screen based on the function designation screen data from the portable terminal device via the network; and an authentication processing unit that performs authentication processing of determining whether or not the received function code matches the displayed function code, wherein the server processing unit transmits operation screen data corresponding to the function code to the portable terminal device via the network when the received function code matches the displayed function code, and does not transmit the operation screen data to the portable terminal device when the received function code does not match the displayed function code.

* * * * *